3,030,396
ORGANO BIMETALLIC COMPOSITIONS
Richard D. Gorsich, Baton Rouge, La., assignor to Ethyl Corporation, New York, N.Y., a corporation of Delaware
No Drawing. Filed Mar. 29, 1961, Ser. No. 99,067
13 Claims. (Cl. 260—429.7)

This invention relates to novel and useful bimetallic compounds, specifically, organo- and halo-manganese carbonyl ligand compounds of metals of group IV–A of the periodic system of the elements and to a novel method for the preparation of such compounds.

Heretofore, certain organic and inorganic metal carbonyls have been suggested as gasoline additives, primarily for the purpose of increasing the antiknock ratings of the gasolines. For example, manganese pentacarbonyl is a highly effective antiknock agent both when used as the sole antiknock agent and when used in combination with alkyllead antiknock compounds, e.g., tetraethyllead. Effective as many of these carbonyl compounds may be, however, they all exhibit certain shortcomings in use which materially decrease their value for the stated purpose. For example, their use is generally associated with more or less severe engine wear and with a shortened useful life of the exhaust valves. It is a specific and valuable property of the compounds of this invention that they minimize these particular problems; as a result of their unusual chemical structure they do have good antiknock properties and yet they do not have the above substantial adverse effects of markedly increasing engine wear and impairing exhaust valve durability.

Accordingly, it is an object of this invention to provide new and useful organo- and halo-manganese carbonyl ligand compounds of metals of group IV–A of the periodic system of the elements. Another object is to provide novel and effective methods for the preparation of such compounds. A further object is to provide compounds which exhibit the good antiknock effectiveness of manganese carbonyls but which are free from the marked disadvantages of shortened valve life and high engine wear associated with the use of prior metallic carbonyls in general. Other important objects of this invention will become apparent hereinafter.

The novel and useful compositions of this invention are bimetallic compounds of the general formula $$R_aX_bM^{IV}[Mn(CO)_4ER'_3]_c$$

In this formula R represents a hydrocarbon group and R' a hydrocarbon or oxyhydrocarbon group; the hydrocarbon portions of these groups (which may be alike or different) are preferably alkyl, alkenyl, aryl, cycloalkyl, aralkyl or alkaryl radicals containing up to about 18 carbon atoms; X is a halogen atom; $M^{IV}$ is an element of group IV–A of the periodic system having an atomic number from 14 to 82, inclusive, i.e., silicon, germanium, tin or lead; E is an element selected from group V–A of the periodic system of the elements and having an atomic number from 15 to 51, inclusive, i.e., phosphorus, arsenic or antimony; $a$ and $b$ are small whole numbers from 0 to 3, inclusive, at least one of which is equal to at least 1; $c$ is a small whole number from 1 to 3, inclusive, and the sum of $a$, $b$ and $c$ is equal to 4. Of these compounds, those wherein X represents chlorine or bromine, those wherein $M^{IV}$ represents tin or lead, those wherein E represents phosphorus or arsenic, and those wherein R and R' represent phenyl are preferred because of the ready availability, economy and ease of handling of the raw materials used directly or indirectly in their synthesis and because of their relatively great volatilities and solubilities in hydrocarbon solvents, which properties contribute markedly to their utilities as antiknock agents and as chemical intermediates.

Triphenyltin manganese tetracarbonyl triphenylphosphine, triphenyltin manganese tetracarbonyl triphenylarsine and trichlorotin manganese tetracarbonyl triphenylphosphine are especially preferred for the reasons noted above and because of their relative ease of preparation.

The compounds of this invention are, in general, solids which melt at moderate temperatures, are stable at ordinary temperatures and can readily be prepared and stored without special precautions for future use. They are white or yellow in color and are distinctly crystalline in habit. These compounds, in general, are soluble in organic solvents such as hydrocarbons, e.g., n-hexane and benzene, and in ethers, especially cyclic ethers such as tetrahydrofuran. Certain of the compounds are sufficiently soluble in ethanol-benzene mixtures and in methylene dichloridehexane mixtures to permit fractional crystallization therefrom.

The novel compounds of this invention are of considerable value in the chemical and allied arts. For example, they are potent antiknock agents and in this utility they are versatile agents in that they are highly effective in both unleaded and conventional leaded gasolines made from a wide variety of base stocks. An additional feature of the present compounds is that when they are used as antiknock agents, the engine wear and exhaust valve durability characteristics of the engine are not markedly impaired, which is the situation brought about by the use of metallic carbonyls heretofore known.

The compounds of this invention are prepared by an alkali metal replacement process wherein an alkali metal manganese tetracarbonyl complex of a triorganophosphine, -arsine or -stibine or of the corresponding triorganophosphite, -arsenite or -antimonite is reacted with an organic or inorganic group IV–A metal halide. In this process, the alkali metal manganese tetracarbonyl ligand reactant can be represented by the general formula $$M^IMn(CO)_4ER'_3$$

wherein $M^I$ is an alkali metal, E is phosphorus, arsenic or antimony and R' is an alkyl, alkoxy, alkenyl, alkenoxy, aryl, aryloxy, cycloalkyl, cycloalkoxy, aralkyl, aralkoxy, alkaryl or alkaryloxy radical containing up to about 18 carbon atoms. This compound is reacted with a compound of the general formula $$R_{4-d}M^{IV}X_d$$

wherein R is an alkyl, alkenyl, aryl, cycloalkyl, aralkyl, or alkaryl radical containing up to about 18 carbon atoms; $M^{IV}$ is an element of group IV–A of the periodic system having an atomic number from 14 to 82, inclusive, i.e., silicon, germanium, tin or lead; X is halogen; and $d$ is a small whole number from 1 to 4, inclusive. In this process, the alkali metal of the carbonyl reactant is replaced by the group IV–A metal-containing radical of the halide reactant. The reaction need not be, but for easy processing is suitably, carried out in an organic solvent such as tetrahydrofuran or any other organic solvent of suitable stability characteristics and suitable solubility characteristics with respect to the reactants and products. Such solvents include, among others, dioxane, dioxolane, diethylene glycol diethyl ether, diethylene glycol dibutyl ether, n-hexane, isooctane, n-cetane, benzene, o-xylene, ethyl benzene, and cumene. The reaction can be carried out at temperatures in the range of 0 to 100° C. Higher and lower temperatures may be used subject to limits set by the liquid range of at least one of the reactants and/or the solvent, the reaction rate and thermal stability of reactants and products. The reaction is a rapid one and proceeds to completion in 30 minutes to 1 hour at room temperature for derivatives of organo groups of low molecular weight. Longer reaction times are desirable for higher-molecular-weight derivatives. It is preferred to use the reactants in stoichiometric proportions because problems of separation and recovery are avoided thereby, at least in part, but an excess of one reactant or the other may be used, if desired, to drive the reaction toward completion.

The carbonyl reactants can readily be prepared by the reaction of alkali metal amalgam with the manganese tetracarbonyl ligand compound in a suitable solvent such as tetrahydrofuran. This reaction occurs rapidly when the components are stirred together in tetrahydrofuran solution at room temperature.

The general procedure for the preparation of the organo metal halide reactant is described in Krause and Von Grosse, "Die Chemie der Metallorganischen Verbindungen," Borntraeger, Berlin, 1937.

Illustrative of the carbonyl reactants are sodium manganese tetracarbonyl triphenyl phosphine, lithium manganese tetracarbonyl triethyl stibine, potassium manganese tetracarbonyl tribenzyl arsine, sodium manganese tetracarbonyl tri-o-tolyl phosphine, lithium manganese tetracarbonyl tricyclopentadienyl arsenite, potassium manganese tetracarbonyl trivinyl antimonite, sodium manganese tetracarbonyl tri-o-xylyl phosphite and lithium manganese tetracarbonyl tricyclohexyl arsenite. Of these reactants, sodium manganese tetracarbonyl triaryl phosphine, especially sodium manganese tetracarbonyl triphenyl phosphine, is especially preferred because of the cheapness of the component alkali metal and because of the relative volatility and solubility in organic solvents of the reactant, which markedly facilitates its purification. Illustrative of the triorgano metal halide reactants are triphenyltin chloride, trivinyltin bromide, trioctyllead bromide, tricetyllead iodide, tribenzylsilicon iodide, triphenethyl silicon chloride, tridodecyltin chloride, tris(methylcyclopentadienyl)germanium bromide, and triallyl germanium iodide. Of these halide reactants, triphenyltin chloride is especially preferred, because of its ease of preparation.

The invention will be more fully understood by reference to the following illustrative examples in which all parts and percentages are by weight.

*Example I*

Sodium amalgam was prepared from 2.0 grams of sodium and 200 grams of mercury. To the amalgam was added about 100 milliliters of tetrahydrofuran and 9.0 grams (0.021 mole) of manganese tetracarbonyl triphenyl phosphine, $Mn(CO)_4P(C_6H_5)_3$. The resulting mixture was stirred rapidly for 25 minutes, during which some orange crystals separated. The excess mercury was drawn off and to the organic solution, containing the sodium manganese tetracarbonyl triphenyl phosphine produced, was added 7.7 grams (0.02 mole) of triphenyltin chloride in small portions over a period of 20 minutes. The mixture was pale yellow after the addition was completed. The tetrahydrofuran was evaporated under reduced pressure (water aspirator). The residue was extracted with refluxing benzene and filtered. The filtrate was concentrated and ethanol was added. After cooling to room temperature, nearly white crystals of triphenyltin manganese tetracarbonyl triphenyl phosphine, $(C_6H_5)_3SnMn(CO)_4P(C_6H_5)_3$ melting at 232–234°, were filtered off. The yield was 11.5 grams (74 percent).

*Example II*

Lithium metal (0.6 part) is converted to amalgam by treatment with 60 parts of mercury. The amalgam is treated with 100 parts of dioxane and 5.8 parts of manganese tetracarbonyl trimethylarsine. After stirring for 30 minutes and removal of the excess mercury, 4.0 parts of trimethyltin chloride is added in small portions over a period of 20 minutes. Evaporation of the dioxane, extraction of the residue with benzene and concentration of the extract as in Example I yield trimethyltin manganese tetracarbonyl trimethylarsine.

*Example III*

10.0 parts of potassium manganese tetracarbonyl tri-tert.-butyl stibine in 100 parts of diethylene glycol dimethylether is treated, over a period of 20 minutes, with 6.6 parts of triethyllead chloride. The resulting mixture is heated to 50° C. and maintained at this temperature for 20 minutes. The product is triethyllead manganese tetracarbonyl tri-tert.-butyl stibine.

*Example IV*

Dioxane solutions of 22.4 parts of sodium manganese tetracarbonyl triisooctylphosphine and 6.7 parts of diethyllead dichloride are mixed and the mixture is treated with 200 parts of dioxane. The product is diethyllead bis(manganese tetracarbonyl triisooctylphosphine).

*Example V*

To 13.7 parts of lithium manganese tetracarbonyl trimethylarsenite, 8.8 parts of didodecylsilicon dichloride is added and the mixture is treated with 200 parts of petroleum naphtha. The resulting mixture is heated to 75° C. and maintained at this temperature for 1 hour. In this manner, didodecylsilicon bis(manganese tetracarbonyl trimethylarsenite) is obtained.

*Example VI*

When 22.4 parts of potassium manganese tetracarbonyl triphenylstibine and 12.1 parts of dioctadecylsilicon dichloride are mixed with 200 parts of toluene and the mixture is stirred for 2 hours at 50° C., dioctadecylsilicon bis(manganese tetracarbonyl triphenylstibine) is obtained.

*Example VII*

Sodium manganese tetracarbonyl trimethylphosphite (18.8 parts) and propylgermanium trichloride (4.4 parts) are dissolved in 300 parts of benzene. The mixture is stirred for 1 hour at room temperature. Propylgermanium tris(manganese tetracarbonyl trimethylphosphite) is obtained.

*Example VIII*

A mixture of 45.4 parts of lithium manganese tetracarbonyl tridodecylarsine, 4.1 parts of vinylgermanium trichloride and 300 parts of cumene is heated to reflux for a period of 2 hours. The product is vinylgermanium tris(manganese tetracarbonyl tridodecylarsine).

*Example IX*

33.5 parts of potassium manganese tetracarbonyl triphenylstibine is dissolved in 300 parts of ethylbenzene and the solution is mixed with 5.3 parts of allyltin trichloride. The mixture is reacted for 1½ hours at room temperature. Allyltin tris(manganese tetracarbonyl triphenylstibine) is obtained.

*Example X*

Tetrahydrofuran solutions of 5.3 parts of sodium manganese tetracarbonyl trimethylphosphine and 4.7 parts of trivinyltin chloride are mixed and the mixture is dissolved in 100 parts of tetrahydrofuran. The resulting solution is heated for ½ hour at 50° C. The product is trivinyltin manganese tetracarbonyl trimethylphosphine.

*Example XI*

To 8.4 parts of lithium manganese tetracarbonyl triallylarsenite, 5.8 parts of trimethyllead chloride is added and the mixture is treated with 100 parts of dioxane. The resulting mixture is heated to 50° C. for ½ hour. Trimethyllead manganese tetracarbonyl triallylarsenite is thus obtained.

*Example XII*

8.3 parts of potassium manganese tetracarbonyl triethylstibine is added to a mixture of 9.5 parts of triphenyllead chloride with 100 parts of diethyleneglycol dibutyl ether and the mixture is stirred at 75° C. for 20 minutes. The product is triphenyllead manganese tetracarbonyl triethylstibine.

*Example XIII*

A mixture of 20.0 parts of sodium manganese tetracarbonyl triphenylphosphite, 5.6 parts of bis-o-tolylsilicon dichloride and 200 parts of tetrahydrofuran is heated to reflux for a period of 1 hour. The product is bis(o-tolyl)silicon bis(manganese tetracarbonyl triphenylphosphite).

*Example XIV*

15.4 parts of lithium manganese tetracarbonyl triethylarsenite is added to a mixture of 6.2 parts of bis (2,4-xylyl) silicon dichloride with 200 parts of petroleum naphtha and the mixture is heated to reflux for a period of 1 hour. Bis(2,4-xylyl)silicon bis(manganese tetracarbonyl triethylarsenite) is obtained.

*Example XV*

Toluene solutions of 21.9 parts of potassium manganese tetracarbonyl tri-tert.-butylantimonite and 5.5 parts of bis(cyclopentadienyl)germanium dichloride are mixed and the mixture is dissolved in 200 parts of toluene. The solution is allowed to stand overnight at room temperature. The product is bis(cyclopentadienyl)germanium bis(manganese tetracarbonyl tri-tert.-butylantimonite).

*Example XVI*

Sodium manganese tetracarbonyl triisooctylphosphine (33.6 parts) and p-cumenylgermanium trichloride (6.0 parts) are treated with 300 parts of benzene. The mixture is heated under reflux for a period of 1½ hours. p-Cumenylgermanium tris(manganese tetracarbonyl triisooctylphosphine) is obtained.

*Example XVII*

Lithium manganese tetracarbonyl tri-o-tolylarsine (31.3 parts) and phenyltin trichloride (6.0 parts) are treated with 300 parts of cymene. The mixture is stirred for 1 hour at room temperature. Phenyltin tris(manganese tetracarbonyl tri-o-tolylarsine) is obtained.

*Example XVIII*

When 41.5 parts of potassium manganese tetracarbonyl tris(m-ethylphenyl)antimonite and 6.6 parts of m-ethylphenyltin trichloride are mixed with 300 parts of hemimellitene and the mixture is heated to 50° for a period of 1½ hours, m-ethylphenyltin tris(manganese tetracarbonyl tri-m-ethylphenylantimonite) is obtained.

*Example XIX*

To 9.9 parts of sodium manganese tetracarbonyl tribenzylphosphine, 10.3 parts of tribenzyllead chloride is added and the mixture is dissolved in 100 parts of tetrahydrofuran. The resulting solution is heated to reflux for 1 hour. The product is tribenzyllead manganese tetracarbonyl tribenzylphosphine.

*Example XX*

10.4 parts of lithium manganese tetracarbonyl tribenzylarsine is added to 7.4 parts of tripropyllead chloride and the mixture is treated with 100 parts of dioxane. Reaction for 1 hour at room temperature results in the formation of tripropyllead manganese tetracarbonyl tribenzylarsine.

*Example XXI*

Dioxolane suspensions of 8.4 parts of potassium manganese tetracarbonyl trimethylantimonite and 8.5 parts of triphenylgermanium chloride are mixed and the mixture is treated with 100 parts of dioxolane. The product is triphenethylgermanium manganese tetracarbonyl trimethylantimonite.

*Example XXII*

19.8 parts of sodium manganese tetracarbonyl triphenylarsine are reacted with a mixture of 6.5 parts of dibenzylgermanium dichloride and 200 parts of p-xylene. The mixture is heated to 40° C. and maintained at that temperature for 1.5 hours. Dibenzylgermanium bis(manganese tetracarbonyl triphenylarsine) is obtained.

*Example XXIII*

A mixture of 20.2 parts of lithium manganese tetracarbonyl triphenethylstibine, 5.6 parts of dibenzylsilicon dichloride and 200 parts of petroleum naphtha is heated to reflux for a period of 2 hours. The product is dibenzylsilicon bis(manganese tetracarbonyl triphenethylstibine).

*Example XXIV*

When 1 mole of tin tetrachloride is reacted with 1 mole of sodium manganese tetracarbonyl triphenyl phosphine according to the procedure of Example I, trichlorotin manganese tetracarbonyl triphenyl phosphine is obtained in good yield.

When the above example is repeated with exception that the molar proportion of the sodium manganese tetracarbonyl triphenyl phosphine is increased to 2 and 3 moles, dichlorotin bis(manganese tetracarbonyl triphenyl phosphine) and chlorotin tris(manganese tetracarbonyl triphenyl phosphine) are obtained respectively in good yield.

*Example XXV*

39.4 parts of sodium manganese tetracarbonyl tripropyl arsine are reacted with a mixture of 24.8 parts of diethyltin dichloride and 200 parts of tetrahydrofuran. The mixture is heated to 50° and maintained at that temperature for 1 hour. The product is diethylchlorotin manganese tetracarbonyl tripropyl arsine.

The above examples have been presented by way of illustration and the scope of the invention is not intended to be limited thereby. Employing the procedures illustrated therein and the process of this invention, other novel products are produced by appropriate substitution of the alkali metal manganese tetracarbonyl ligand and group IV-A metal reactants described hereinbefore. Thus, employing the process of this invention, the following novel products are also produced: trimethylsilicon manganese tetracarbonyl tripropyl phosphine from trimethylsilicon chloride and sodium manganese tetracarbonyl tripropyl phosphine; diethylgermanium bis(manganese tetracarbonyl triisobutylarsenite) from diethylgermanium dichloride (1 mole) and sodium manganese tetracarbonyl triisobutylarsenite (2 moles); propyltin tris(manganese tetracarbonyl trioctylstibine) by reaction of propyltin trichloride with 3 moles of sodium manganese tetracarbonyl trioctylstibine; tributyllead manganese tetracarbonyl tricetylphosphite from tributyllead chloride and sodium manganese tetracarbonyl tricetyl phosphite; diisobutylsilicon bis(manganese tetracarbonyl triallylarsine) from 1 mole of diisobutylsilicon dichloride and 2 moles of sodium manganese tetracarbonyl triallylarsine; neopentylgermanium tris(manganese tetracarbonyl triallylantimonite) by reaction of 1 mole of neopentyl germanium trichloride with 3 moles of sodium manganese tetracarbonyl triallylantimonite; trioctyltin manganese tetracarbonyl triphenyl phosphine from trioctyltin chloride and sodium manganese tetracarbonyl triphenyl phosphine; and didecyllead bis(manganese tetracarbonyl tri-m-cumenylarsenite) by reaction of didecyllead dichloride with 2 moles of sodium manganese tetracarbonyl tri-m-cumenylarsenite. By similar procedures the following new compounds are produced from the appropriate components: cetylsilicon tris(manganese tetracarbonyl tricyclopentadienyl stibine), trivinylgermanium manganese tetracarbonyl tribenzylphosphite, diallyltin bis(manganese tetracarbonyl trimesitylarsine), 2-pentenyllead tris(manganese tetracarbonyl tri-α-naphthylantimonite), triallylsilicon manganese tetracarbonyl trimethylphosphine, diphenylgermanium bis(manganese tetracarbonyl tripropylarsenite), m-tolyltin tris(manganese tetracarbonyl triisobutylstibine), tris(2,5-xylyl)lead manganese tetracarbonyl trioctylphosphite, bis(m-cumenyl)silicon bis(manganese tetracarbonyl tricetylarsine), cyclopentadienyl germanium tris(manganese tetracarbonyl triallylantimonite), tris(methylcyclopentadienyl)tin manganese tetracarbonyl triallylphosphine, bis(cyclohexyl)lead bis(manganese tetracarbonyl triphenylarsenite), ethylcyclopentylsilicon tris(manganese tetracarbonyl tri-m-cumenylstibine), tribenzylgermanium manganese tetracarbonyl tricyclopentylphosphite, bis(phenethyl)tin bis(manganese tetracarbonyl tribenzylarsine), p-ethylphenyllead tris(manganese tetracarbonyl trimesitylantimonite), trimesitylsilicon manganese tetracarbonyl tri-α-naphthylphosphine, di-α-naphthylgermanium bis(manganese tetracarbonyl trimethylarsenite), 2-indenyltin tris(manganese tetracarbonyl tripropylstibine) and tris(2-fluorenyl) lead manganese tetracarbonyl triisobutylphosphite.

In carrying out the reactions of this invention, the reactants are normally combined as indicated above in approximately stoichiometric proportions. A slight excess of one reactant or the other is often used to bring about an increased reaction rate.

The solvents employed in the alkali metal replacement reaction of this invention may include aliphatic hydrocarbons such as n-hexane, isooctane, n-cetane and petroleum naphtha and the like, aromatic hydrocarbons such as benzene, toluene and xylene and the like, and ethers such as tetrahydrofuran, dioxane, dimethyl ether of diethylene glycol and the like. The solvent of choice is tetrahydrofuran because of its relatively high solubility for the reactants and its volatility, the latter being of particular value in that it facilitates the separation of the solvent and the recovery of the product.

The reaction of this invention may be carried out at any temperature and pressure within the liquid range of the solvent or of one of the reactants. Ordinarily temperatures between about 10 to 120 are employed for best results. Room temperature is perfectly satisfactory in most instances.

Because the reactions ordinarily proceed at satisfactory rates under normal pressure conditions, atmospheric pressure is usually satisfactory but pressures ranging from 10 millimeters of mercury to 100 atmospheres may be used if desired.

The reactions of this invention may be carried out under any atmosphere inert to the reactants and products. The compounds are stable on exposure to dry air, which can thus be used with safety. Other suitable protective atmospheres include dry nitrogen, helium, neon, argon, krypton and xenon.

The normally solid compounds of this invention are soluble in and can be purified by recrystallization from a variety of organic solvents. Specifically, simple aromatic solvents such as benzene or toluene, simple aliphatic solvents such as hexane, alcohols such as ethanol and halohydrocarbons such as methylene chloride and carbon tetrachloride, and their mixtures, are found to be satisfactory.

As stated above, the compounds of this invention are useful as antiknock agents for internal combustion engine fuels. They may suitably be employed in concentrations varying from that corresponding to about 0.005 gram of manganese per gallon to their saturation concentrations at ambient temperature. They are highly effective agents and their versatility is shown by the fact that they can be added to the fuel either alone or in combination with other antiknock agents such as tetraethyllead. For example, the addition of 0.01 gram of manganese per gallon as triphenyllead manganese tetracarbonyl triphenylphosphine to a catalytically cracked gasoline increases the octane number. Similar such enhancement in the octane number of fuels is obtained employing other novel products of this invention. Moreover, the use in internal combustion engine fuels of the phosphorus-containing compounds of this invention results in increased spark plug life and reduced exhaust valve wear.

Furthermore, since the bimetallic compounds of this invention are relatively unstable at high temperature, they can be used to plate an alloy of the component metals on a suitable substrate by contacting the heated substrate with the appropriate compound. The arsenic compounds of this invention are effective insecticidal agents for agricultural use and the tin compounds are excellent thermal stabilizers for polyvinyl chloride and the like.

Other uses for the novel products of this invention will now be evident.

Having thus described the novel products and method by which they are produced, it is not intended to be limited except as set forth in the following claims.

I claim:

1. A compound represented by the general formula $$R_a X_b M^{IV}[Mn(CO)_4 ER'_3]_c$$

wherein R is a hydrocarbon radical having up to about 18 carbon atoms; R' is a radical selected from the group consisting of hydrocarbon and oxyhydrocarbon radicals having up to about 18 carbon atoms; X is a halogen; $M^{IV}$ is an element selected from group IV–A of the periodic system of the elements and having an atomic number from 14 to 82, inclusive; E is an element selected from group V–A of the periodic system of the elements and having an atomic number from 15 to 51, inclusive; $a$ and $b$ are small whole numbers from 0 to 3, inclusive, at least one of which is equal to at least 1; $c$ is a small whole number from 1 to 4, inclusive, and the sum of $a$, $b$ and $c$ is equal to 4.

2. The compound of claim 1 wherein $a$ is 0 to 2, inclusive, and X is chlorine.
3. The compound of claim 1 wherein $M^{IV}$ is tin.
4. The compound of claim 1 wherein $M^{IV}$ is lead.
5. The compound of claim 1 wherein E is phosphorus.
6. The compound of claim 1 wherein E is arsenic.
7. The compound of claim 1 wherein $a$ is 3.
8. Triphenyltin manganese tetracarbonyl triphenylphosphine.
9. Triphenyltin manganese tetracarbonyl triphenylarsine.
10. The compound of claim 1 wherein $a$ is 0.
11. Trichlorotin manganese tetracarbonyl triphenylphosphine.
12. The method of preparing the compound of claim 1 which comprises reacting a ligand compound represented by the general formula $$M^I Mn(CO)_4 ER'_3$$

with a reactant represented by the general formula $$R_{4-d} M^{IV} X_d$$

wherein $M^I$ is an alkali metal; R is a hydrocarbon radical having up to about 18 carbon atoms; R' is a radical selected from the group consisting of hydrocarbon and oxyhydrocarbon radicals; X is a halogen; $M^{IV}$ is an element selected from group IV–A of the periodic system of the elements and having an atomic number from 14 to 82, inclusive; E is an element selected from group V–A of the periodic system of the elements and having an atomic number from 15 to 51, inclusive; and $d$ is a small whole number from 1 to 4, inclusive.

13. The method of claim 12 wherein the said ligand compound is sodium manganese tetracarbonyl triphenylphosphine and the said reactant is triphenyltin chloride.

References Cited in the file of this patent

UNITED STATES PATENTS 3,007,953     Closson et al. _____ Nov. 7, 1961